Sept. 17, 1929. S. M. VIALE ET AL 1,728,315
SCREW PROPELLER
Filed Sept. 14, 1926 3 Sheets-Sheet 1

Spirito Mario Viale
Herbert Langley Towns
Inventors
By Edw. Taulinsky
Their Attorney Sept. 17, 1929.　　S. M. VIALE ET AL　　1,728,315
SCREW PROPELLER
Filed Sept. 14, 1926　　3 Sheets-Sheet 2

Spirito Mario Viale
Herbert Langley Towns
Inventors
By Edw. Paulinsky
Their Attorney

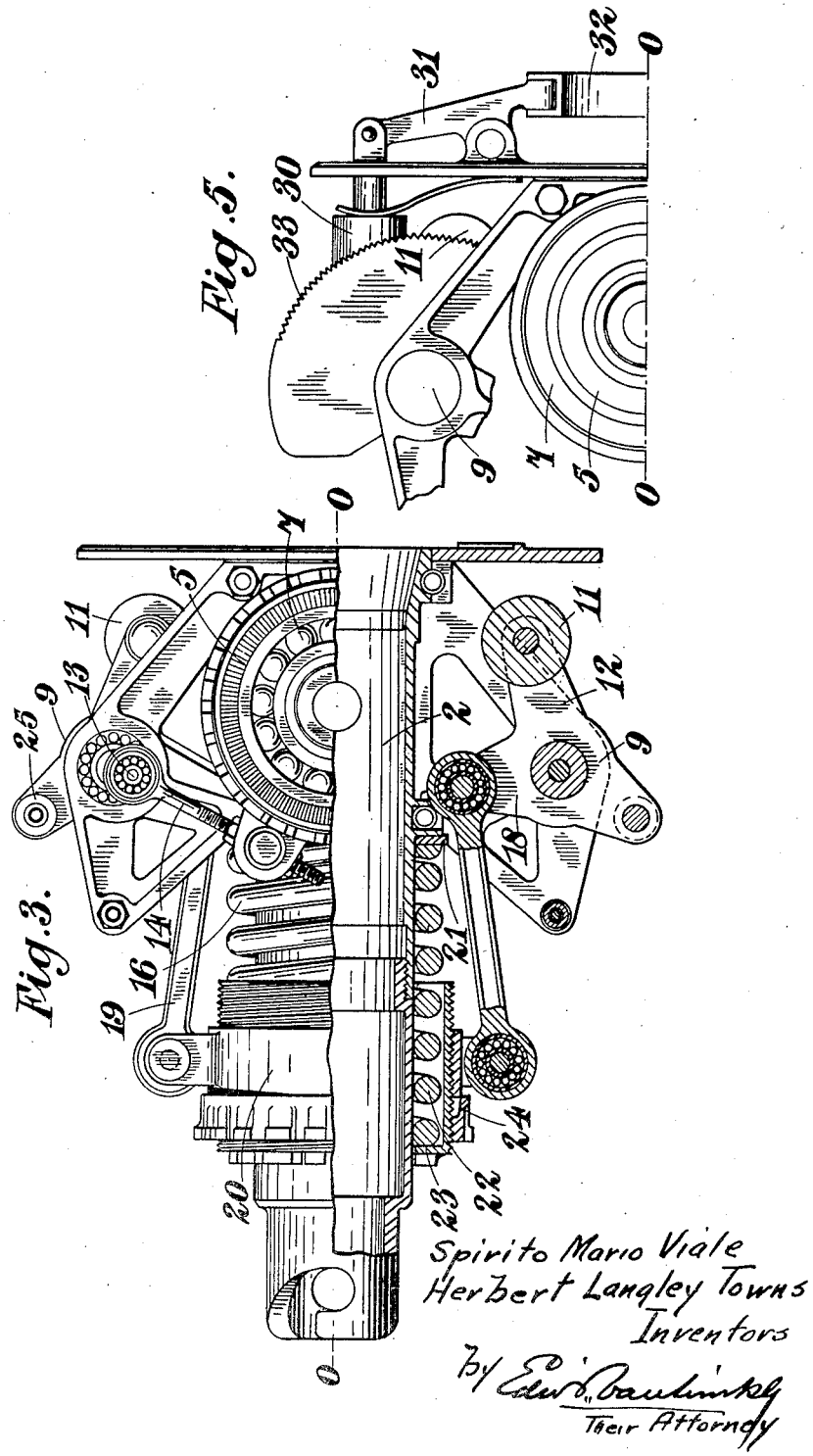

Patented Sept. 17, 1929

1,728,315

UNITED STATES PATENT OFFICE

SPIRITO MARIO VIALE AND HERBERT LANGLEY TOWNS, OF COVENTRY, ENGLAND, ASSIGNORS TO ARMSTRONG SIDDELEY MOTORS LIMITED, OF COVENTRY, ENGLAND, A BRITISH COMPANY

SCREW PROPELLER

Application filed September 14, 1926, Serial No. 135,415, and in Great Britain September 19, 1925.

This invention relates to screw propellers, of the kind in which the blades are angularly movable at their connections with the hub to vary their pitch, and means centrifugally operated are provided upon the hub to vary their pitch during the rotation of the propeller and in accordance with changes in its speed.

In previously proposed constructions, except where the blades moved radially outwards under centrifugal force and at the same time twisted on their longitudinal axes to effect the change of pitch, or had directly attached to them, offset weights adapted under centrifugal force to apply the requisite torque to the blade, it has been customary to regulate the pitch by means of servo devices controlled by centrifugal force and acting directly through toothed gearing on the blades, or indirectly through differential mechanism. One proposed servo device for an air screw comprised a coaxially arranged independently air-driven screw having the pitch of its blades directly variable by a centrifugal device mounted on the hub of the main propeller. This permitted changes in relative speed of the main propeller and the servo device, whereby the former's pitch could be changed as desired.
The principal object of the present invention is to provide a very simple form of mechanism which will not involve radial movement of the blades, and, being particularly intended for use on aircraft, will be very easily controlled, not liable to derangement in use, and so compact as not materially to increase the ordinary space occupied by the propeller, nor to add to any great extent to its weight.
According to this invention, the centrifugally operated mechanism comprises a weighted lever pivoted to the propeller hub and provided with a crank or eccentric operatively connected to the propeller blade.
This considerably simplifies the mechanism, as it enables the centrifugal force to be transmitted in a very direct manner to the blades, as for instance, by linkwork.

The mechanism may be so arranged initially that either an increase of rotational speed produces an increase of pitch (with the converse effect when the rotational speed is diminished), or so that an increase of rotational speed produces a reduction of pitch, (also with the converse effect when the speed is reduced).

Means may be provided for locking the mechanism and/or blades when any desired pitch has been obtained, so that subsequent changes of speed may not affect the pitch until desired, and the locking mechanism has been released for the purpose.

A control device acting in conjunction with the centrifugal mechanism may comprise a spring coaxial with the axis of the propeller and preferably mounted on its hub, or on an extension thereof. The functions of control mechanism so arranged are obviously unaffected by centrifugal force.

In the accompanying drawings, which illustrate a preferred construction as applied to a two-bladed propeller as used on aircraft, Figure 1 is a side elevation of the hub showing the sleeves for attachment of the two blades but omitting the blades themselves, Figure 2 is an end view as seen from the left of Figure 1, the left half of the figure being in outside elevation and the right half in section on the line II—II Figure 1,

Figure 3 is a plan view of Figure 1 partly in section, and

Figures 4 and 5 show two alternative methods of locking the blades.

Figure 1:
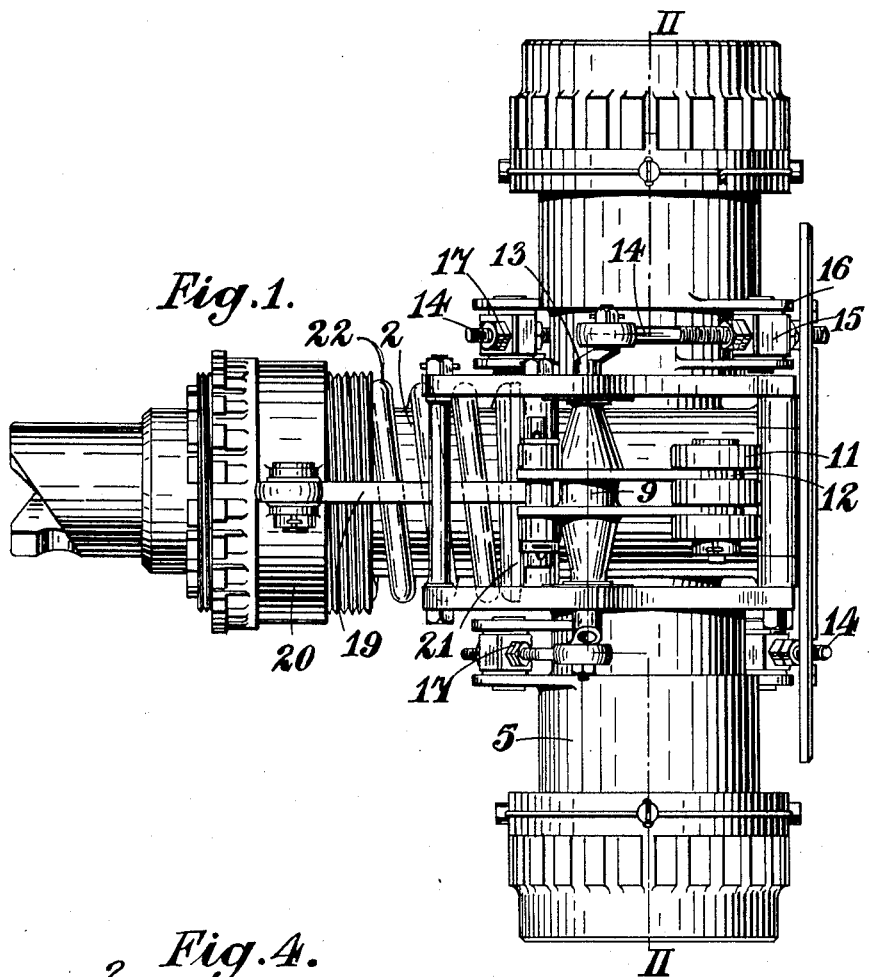

For the propeller, a hub 2 of cylindrical form is provided with two oppositely disposed radial stems 3 and 4, each provided with a sleeve 5 rotatably mounted upon it by antifriction bearings 6 and 7. The sleeves may also be transversely divided and provided with relatively fine co-operating serrations which permit of fine relative angular adjustment of the blade in reference to the sleeve, suitable clamping means being provided to draw the two parts of the sleeve securely together.

Carried by brackets 8 arranged on each side of the hub 2 are, in effect, bellcrank levers 9 pivoted at 10 to the brackets and provided with bob weights 11 at the end of the arm

12, and so located that the weights may move in substantially a radial path. Both pivots of each bellcrank lever are extended on the outer sides of the brackets and there carry cranks 13 or eccentrics operatively connected by links 14 to pivotally mounted blocks 15 carried by lugs 16 on the angularly movable sleeves 5 to which the respective blades are attached. Each bellcrank lever partially and simultaneously operates both of the blade sleeves, so that a synchronized increase or decrease in the pitch of the blades is obtained.

The links connecting the bellcrank levers with the sleeves are adjustable as to length to ensure the similarity of initial pitch of the two blades, and this is effected by screw-threading them where they extend through the pivoted block 15 and retaining them by lock nuts 17.

To prevent uncontrolled action of the weights under centrifugal force, one arm 18 of each bellcrank lever is connected by a link 19 to a collar 20 slidably mounted upon the hub of the propeller. Between this slidable collar and a fixed collar 21, also provided upon the hub, is located a compression spring 22, and adjustment means 23, 24 are provided for varying its initial loading. The arms of the bellcrank lever are so arranged that whilst the weight attached to one moves in a substantially radial direction, the end of the link attached to the other arm and connected to the slidable collar is moved in a substantially axial direction so that with an increase of speed and an outward movement of the weights, the load upon the spring is increased by the corresponding movements of the slidable collar engaging it.

The proportions of the bellcrank lever and the bob weight carried by it are so chosen in conjunction with the resistance of the spring mounted upon the hub that they are adapted to produce the requisite angular movement of the blades at their attachment to the hub and thereby the required pitch of the blades. All parts of the mechanism may be balanced (if necessary by compensating bob weights such as 25) so that the whole of the control lies between the main bob weights and the compression spring on the hub of the propeller. It will be evident, therefore, that as the speed changes, so will the radial position of the bob weights alter, and thus the angular position of the blades in their attachment to the hub. Obviously the operative connection of the bellcrank lever with the blade-carrying sleeves may be such that increase of speed produces either increase of pitch or the converse.

Figure 4:
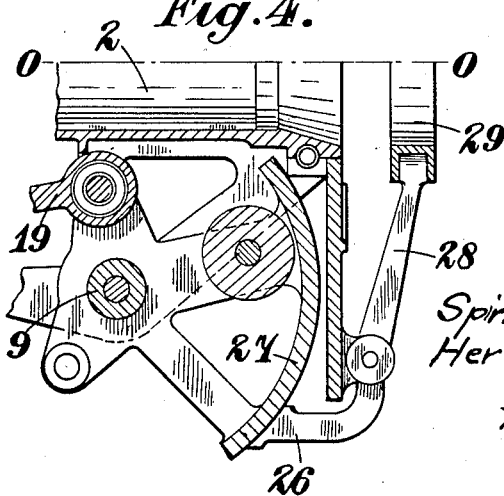
Figure 2:
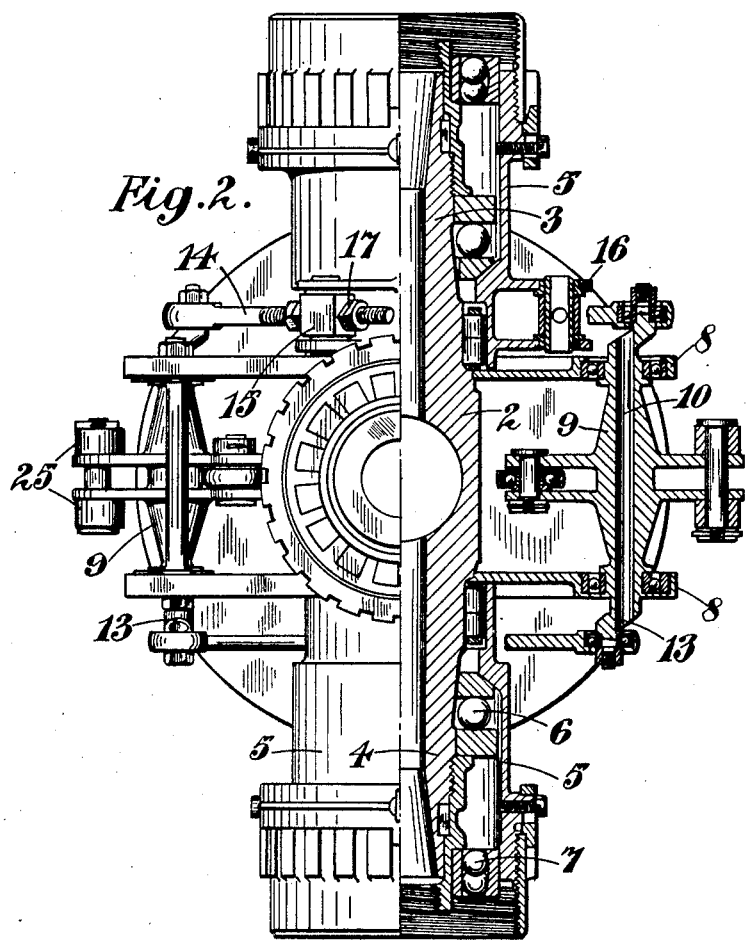

To enable the blades to be held at any desired position corresponding to a required pitch, any suitable mechanism can be employed, such as a friction clutch (Figure 4), adapted to lock the parts at any position, and comprising a pad 26 bearing against a curved surface 27 on the blade or bellcrank lever 9 and actuated through a lever 28 connected to a collar 29 slidable on the propeller shaft.

Alternatively, a positive locking device such as a ratchet-and-pawl (Figure 5) could be employed and would hold the blade positively at a given position, but so that movement could take place in one direction only. When the pawl 30 actuated by the lever 31 and collar 32 slidable on the prepeller shaft, (whose axis is indicated at 0.0 in each case), is engaged with the ratchet teeth 33 formed on a surface curved either about the axis of the blade or of the bellcrank lever 9, the pitch could not, for example, alter as the revolutions were reduced, although it might alter if the revolutions were increased beyond the speed at which the pawl was engaged. The pawl or the friction clutch mechanism could be arranged and operated by any preferred means, which, in the case of aircraft, would be controllable by the pilot from the cockpit. The locking system could either directly act on the blade sleeves or upon the bob weights themselves.

It will be understood that although centrifugally operated mechanism only has been described, the movements of the blades would equally well be controlled by so called "inertia" mechanism, in which the pivoted lever swings in the plane of rotation and the weight lags or over-runs, as the case may be, when the speed of the propeller changes.

By this invention, therefore, it is possible in a very simple manner for a pilot or other operator to alter the pitch of the propeller by automatically operating mechanism depending on the speed of the propeller, and if preferred this mechanism may operate so that the pitch automatically accommodates itself to the revolutions, or alternatively the pilot may bring the propeller to a speed which will give the required pitch, and thereafter lock the blades so that until a further adjustment is made the propeller remains of unaltered pitch.

What we claim as our invention and desire to secure by Letters Patent of the United States is:—

1. In a screw propeller, the combination of a hub, two blades connected thereto by coaxial swivel joints permitting variations of effective pitch but without radial movement of the blades, a weight pivoted to said hub about an axis transverse to that of the hub, said weight movable under centrifugal force, and provided with a crank operatively connected to the blade and constructed to swivel the latter, a spring surrounding the hub for controlling the centrifugal mechanism opposing the movement of said weight, through action of centrifugal force, whereby the pitch of the blades is automatically made to accommodate itself to the revolutions.

2. The device of claim 1 with the addition of means for locking the controlling mechanism when the desired pitch of the blades is attained.

In testimony whereof we have signed our names to this specification.

SPIRITO MARIO VIALE.
HERBERT LANGLEY TOWNS.